(12) United States Patent
Zhong et al.

(10) Patent No.: US 9,548,501 B2
(45) Date of Patent: Jan. 17, 2017

(54) SUPPORTED CATALYST

(75) Inventors: Chuan-Jian Zhong, Endwell, NY (US);
Brigid Wanjala, Johnson City, NY (US); Jin Luo, Vestal, NY (US); Peter N. Njoki, Binghamton, NY (US);
Rameshwori Loukrakpam, Binghamton, NY (US); Minhua Shao, Manchester, CT (US); Lesia V. Protsailo, Bolton, CT (US); Tetsuo Kawamura, Aichi (JP)

(73) Assignees: The Research Foundation of State University Of New York Research Development Services, Binghamton University, Binghamton, NY (US); Toyoata Jidosha Kabushiki Kaisha, Toyota-Shi (JP); Audi AG, Ingolstadt (DE)

( * ) Notice: Subject to any disclaimer, the term of this patent is extended or adjusted under 35 U.S.C. 154(b) by 78 days.

(21) Appl. No.: 13/498,665

(22) PCT Filed: Dec. 17, 2009

(86) PCT No.: PCT/US2009/068364
§ 371 (c)(1),
(2), (4) Date: Mar. 28, 2012

(87) PCT Pub. No.: WO2011/075125
PCT Pub. Date: Jun. 23, 2011

(65) Prior Publication Data
US 2012/0190536 A1    Jul. 26, 2012

(51) Int. Cl.
*B01J 23/40* (2006.01)
*H01M 4/92* (2006.01)
(Continued)

(52) U.S. Cl.
CPC ........... *H01M 4/921* (2013.01); *H01M 4/9083* (2013.01); *H01M 4/926* (2013.01);
(Continued)

(58) Field of Classification Search
USPC ........................................................ 502/185
See application file for complete search history.

(56) References Cited

U.S. PATENT DOCUMENTS

| 4,970,128 A | 11/1990 | Itoh et al. |
|---|---|---|
| 5,024,905 A | 6/1991 | Itoh et al. |

(Continued)

FOREIGN PATENT DOCUMENTS

| EP | 0 129 399 A1 | 12/1984 |
|---|---|---|
| EP | 0 556 535 A1 | 8/1993 |

(Continued)

OTHER PUBLICATIONS

International Preliminary Report on Patentability dated Jun. 28, 2012 for PCT/US2009/068364.

(Continued)

*Primary Examiner* — Melissa Swain
*Assistant Examiner* — Melissa Stalder
(74) *Attorney, Agent, or Firm* — Seed IP Law Group LLP

(57) ABSTRACT

A supported catalyst is prepared by a process that includes establishing shell-removal conditions for a supported catalyst intermediate that includes capped nanoparticles of a catalyst material dispersed on a carbon support. The capped nanoparticles each include a platinum alloy core capped in an organic shell. The shell-removal conditions include an elevated temperature and an inert gas atmosphere that is substantially free of oxygen. The organic shell is removed from the platinum alloy core under the shell-removal conditions to limit thermal decomposition of the carbon support and thereby limit agglomeration of the catalyst material such (Continued)

that the supported catalyst includes an electrochemical surface area of at least 30 $m^2/g_{Pt}$.

19 Claims, 2 Drawing Sheets

(51) Int. Cl.
*H01M 4/90* (2006.01)
*B01J 21/18* (2006.01)

(52) U.S. Cl.
CPC .............. *B01J 21/18* (2013.01); *B01J 21/185* (2013.01); *Y02E 60/50* (2013.01)

(56) References Cited

U.S. PATENT DOCUMENTS

| | | |
|---|---|---|
| 5,079,107 A | 1/1992 | Jalan |
| 5,178,971 A | 1/1993 | Itoh et al. |
| 5,876,867 A | 3/1999 | Itoh et al. |
| 6,262,129 B1 | 7/2001 | Murray et al. |
| 7,053,021 B1 | 5/2006 | Zhong et al. |
| 7,208,439 B2 | 4/2007 | Zhong et al. |
| 7,335,245 B2 | 2/2008 | He et al. |
| 8,404,174 B2 | 3/2013 | Nakanishi et al. |
| 8,491,697 B2 | 7/2013 | Watanabe et al. |
| 2003/0079566 A1 | 5/2003 | Biberbach |
| 2005/0235776 A1* | 10/2005 | He et al. ................. 75/255 |
| 2006/0246344 A1 | 11/2006 | Halalay et al. |
| 2006/0251954 A1 | 11/2006 | Merzougui et al. |
| 2006/0269824 A1 | 11/2006 | Hampden-Smith et al. |
| 2007/0160899 A1 | 7/2007 | Atanassova et al. |
| 2008/0090128 A1 | 4/2008 | Saito et al. |
| 2009/0192030 A1 | 7/2009 | Myers et al. |

FOREIGN PATENT DOCUMENTS

| | | |
|---|---|---|
| JP | 56-155645 A | 12/1981 |
| JP | 60-7941 A | 1/1985 |
| JP | 2-61961 A | 3/1990 |
| JP | 2-236960 A | 9/1990 |
| JP | 4-87260 A | 3/1992 |
| JP | 4-141235 A | 5/1992 |
| JP | 10-69914 A | 3/1998 |
| JP | 2003-129102 A | 5/2003 |
| JP | 2006-175365 A | 7/2006 |
| JP | 2006-179427 A | 7/2006 |
| JP | 2007-533862 A | 11/2007 |
| JP | 2008-47473 A | 2/2008 |
| JP | 2009-523066 A | 6/2009 |
| JP | 2010-146980 A | 7/2010 |
| JP | 2011-40207 A | 2/2011 |
| WO | 2004/045793 A1 | 6/2004 |
| WO | 2005/118184 A2 | 12/2005 |
| WO | 2006/038676 A1 | 4/2006 |
| WO | WO2006/119402 A2 | 11/2006 |
| WO | 2008/112679 A1 | 9/2008 |

OTHER PUBLICATIONS

Search Report and Written Opinion mailed on Aug. 27, 2010 for PCT/US2009/068364.
International Preliminary Report on Patentability, issued Jun. 19, 2012, for International Application No. PCT/US2009/068382, 6 pages.
International Search Report, mailed Sep. 14, 2010, for International Application No. PCT/US2009/068382, 3 pages.

* cited by examiner

SUPPORTED CATALYST

BACKGROUND OF THE INVENTION

This disclosure relates to stable, high activity platinum alloy catalysts for use in fuel cells or other catalyst applications.

Fuel cells are commonly used for generating electric current. For example, a single fuel cell typically includes an anode catalyst, a cathode catalyst, and an electrolyte between the anode and cathode catalysts, for generating an electric current in a known electrochemical reaction between a fuel and an oxidant.

One issue encountered with fuel cells is the operational efficiency of the catalysts. For example, electrochemical activity at the cathode catalyst is one parameter that controls the efficiency. An indication of the electrochemical activity is the rate of electrochemical reduction of the oxidant at the cathode catalyst. Platinum has been used for the cathode catalyst. However, platinum is expensive and has a high over-potential for the cathodic oxygen reduction reaction. Also, platinum is relatively unstable in the harsh environment of the fuel cell. For instance, elevated temperatures and potential cycling may cause degradation of the electrochemical activity of the platinum over time due to catalyst dissolution and particle migration.

Platinum has been alloyed with certain transition metals to increase the catalytic activity and provide greater stability. Even so, the catalytic activity and stability for a given alloy composition depends to a considerable degree on the technique used to fabricate the alloy. As an example, some techniques may produce relatively large catalyst particle sizes and poor dispersion of the alloying elements, which may yield poor electrochemical activity in a fuel cell environment, despite the alloy composition.

SUMMARY OF THE INVENTION

An exemplary supported catalyst is prepared by a process that includes establishing shell-removal conditions for a supported catalyst intermediate that includes capped nanoparticles of a catalyst material dispersed on a carbon support. The capped nanoparticles each include a platinum alloy core capped in an organic shell. The shell-removal conditions include an elevated temperature and an inert gas atmosphere that is substantially free of oxygen. The organic shell is removed from the platinum alloy core under the shell-removal conditions to limit thermal decomposition of the carbon support and thereby limit agglomeration of the catalyst material such that the supported catalyst includes an electrochemical surface area of at least 30 $m^2/g_{Pt}$.

In another aspect, an exemplary supported catalyst includes a carbon support and nanoparticles dispersed on the carbon support. The nanoparticles include a platinum alloy catalyst material having an electrochemical surface area of at least 30 $m^2/g_{Pt}$.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
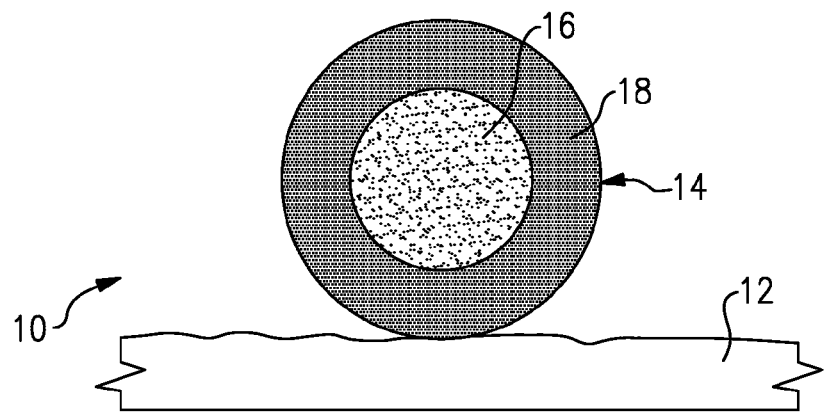
FIG. 1 illustrates an example of a supported catalyst intermediate having a capped nanoparticle that includes an organic shell.

FIG. 1 illustrates selected portions of an example supported catalyst intermediate 10 that, once in final form, may be used in a fuel cell or other catalytic environment. In this example, the supported catalyst intermediate 10 is "in-process" and is in an intermediate form relative to the intended final supported catalyst. In this case, the supported catalyst intermediate 10 includes a carbon support 12 that supports a plurality of capped nanoparticles 14 (only one capped nanoparticle 14 is shown but is representative of a plurality). As an example, the capped nanoparticles 14 may have an average particle size determined on a nanoscopic scale. In some examples, the nanoscopic scale may be 1-100 nanometers. However, for many end uses, a desirable particle size may be less than 10 nanometers, or even under 3 nanometers. In the below examples, the average size of the nanoparticles 14 may be 1-10 nanometers and more specifically 3-6 nanometers, although other sizes may be used.

Each of the capped nanoparticles 14 includes a platinum alloy core 16 capped in (i.e., surrounded by) an organic shell 18. The organic shell 18 is a product of the technique used to fabricate the capped nanoparticle 14. The supported catalyst intermediate 10 may be fabricated using known polyol processing techniques. As an example, the supported catalyst intermediate 10 may be fabricated using the techniques disclosed in U.S. Pat. Nos. 7,053,021 and 7,335,245, which utilize polyol processing techniques. However, this disclosure is not limited to the methods disclosed therein.

As is known, the polyol processing technique provides a platinum alloy core 16 surrounded by a capping material, the organic shell 18 in this case. In a few examples, the platinum alloy core 16 may include platinum in combination with one or more alloy metals. The alloy metal may be iron, nickel, cobalt, iridium, chromium, molybdenum, palladium, rhodium, gold, copper, vanadium, or combinations thereof. In some examples, the platinum alloy core 16 may include only the given elements, or the given elements and impurities or additions that do not materially affect the properties of the platinum alloy core 16.

In some examples, the platinum alloy core 16 is a ternary or quaternary alloy that includes, respectively, three or four different metals. For instance, the platinum alloy core 16 may include platinum, cobalt, and at least one alloy metal M selected from iron, nickel, iridium, chromium, molybdenum, palladium, rhodium, gold, copper and vanadium. The platinum alloy core 16 may have a composition $Pt_xCo_yM_z$, where the variables x, y, and z are atomic percentages that sum to one-hundred, and x is 20%-60%, y is 20%-60%, and z=100−x−y. In a few specific examples, the platinum alloy core 16 may be $Pt_{20-60}Ni_{5-20}Co_{30-60}$ or $Pt_{20-60}V_{5-20}Co_{30-60}$. The example compositions are well suited for end use in a fuel cell because of the high electrochemical activity and stability (resistance to dissolution and degradation).

The material of the organic shell 18 depends on the specific parameters selected for the fabrication technique. For instance, the organic shell 18 may be oleylamine, oleic acid, thiol, polyacrylic acid, trimethylaluminum, tetraoctylammonium bromide, sodium dodecyl sulfate, acetic acid, cetryltrimethylammonium chloride, or a combination thereof. In this case, the organic shell 18 is shown schematically but may include organic molecule ligands that are bonded to the platinum alloy core 16 in a known manner.

The capped nanoparticles 14 may be deposited onto the carbon support 12 in a known manner. The carbon support 12 may be carbon black particles. However, in other examples, the carbon support 12 may be another type of support suited for the particular intended end use such as unmodified carbon black, modified carbon black, carbon nanotubes, carbon nanowire, carbon fibers, graphitized carbon black, carbides, oxides, boron doped diamond, and combinations thereof.

In this regard, the organic shells 18 of the capped nanoparticles 14 facilitate attaching the capped nanoparticles to the carbon support 12. Additionally, the organic shells 18 limit agglomeration of the platinum alloy cores 16, which might otherwise result in relatively large particles with limited chemical activity.

The organic shell 18 must be removed to expose the platinum alloy core 16 for catalytic activity. One premise of this disclosure is that prior methods used to remove organic shells may thermally decompose the carbon support 12 and lead to agglomeration of the platinum alloy cores 16. For instance, loss of the carbon support 12 through decomposition results in agglomeration of the platinum alloy cores 16 and a resultant larger particle size distribution. The larger agglomerate particles have lower electrochemical activity in a catalytic environment because less platinum of the alloy is exposed. However, as will be described in more detail, the exemplary methods disclosed herein for removing the organic shell 18 facilitate limiting decomposition of the carbon support 12 and agglomeration to provide a supported catalyst 10' (FIG. 2) that is durable and has enhanced electrochemical activity.

Figure 2:
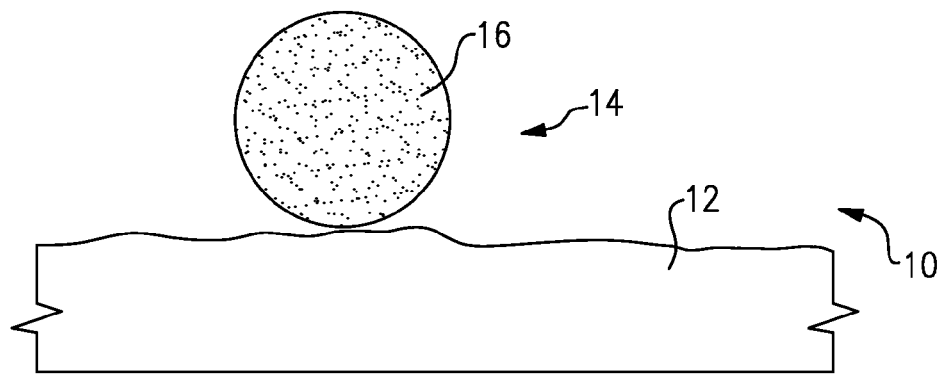
FIG. 2 illustrates a supported catalyst after removing an organic shell.

FIG. 2 illustrates the supported catalyst 10' nanoparticle 14' (hereafter nanoparticle 14' representing a plurality of nanoparticles 14') after removal of the organic shell 18. In this case, the platinum alloy core 16 is generally the same size as shown in FIG. 1 and has not combined or clustered with other platinum alloy cores 16.

Figure 3:
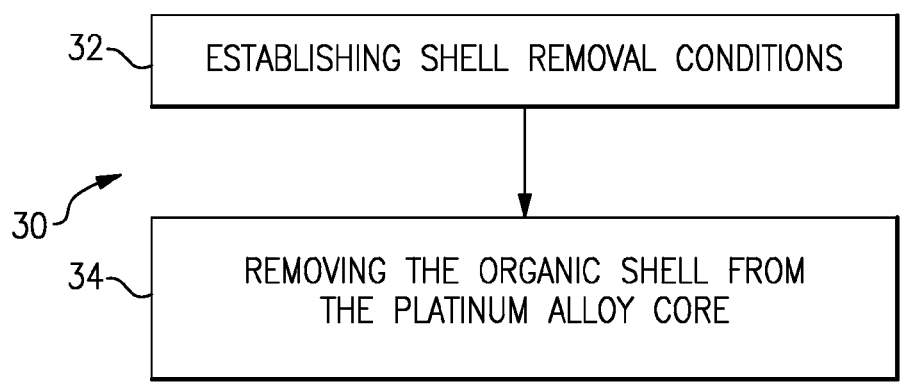
FIG. 3 illustrates an example of a method for treating a supported catalyst.

The techniques used to fabricate the nanoparticles 14' may influence the electrochemical activity. In this regard, similar compositions that are fabricated using different techniques may have different electrochemical activities. The nanoparticles 14' may be fabricated according to method 30 illustrated in FIG. 3 to achieve a relatively high electrochemical activity.

The method 30 may be used to remove the organic shell 18 in a manner that facilitates limiting decomposition of the carbon support 12 and agglomeration of the platinum alloy cores 16. In this example, the method 30 includes a step 32 of establishing shell-removal conditions and a step 34 of removing the organic shell from the platinum alloy core 16. As an example, the establishing of the shell-removal conditions and the removing of the organic shell may be concurrent and/or overlapping in time and/or space. Generally, the shell-removal conditions may be maintained for a period of time in order to effect removal.

The shell removal conditions in step 32 may include an elevated temperature and an inert gas atmosphere that is substantially free of oxygen. That is, establishing the shell removal conditions may include providing the elevated temperature and the inert gas atmosphere conditions for treating the supported catalyst intermediate 10. In one example, step 32 may include heating a treatment chamber to the desired temperature and regulating the atmosphere in the chamber, such as by purging air out of the chamber with the inert gas. Known techniques may be used to set the temperature and atmosphere to desirable set points.

Subjecting the supported catalyst intermediate 10 to the shell-removal conditions removes the organic shell 18 from the platinum alloy core 16 in step 34. The elevated temperature decomposes the organic shell 18. The decomposed shell material may vaporize into the surrounding inert gas atmosphere. Depending on the shell composition, reactive intermediates may be released during decomposition. The inert gas atmosphere may be continually purged to reduce build-up of concentrations of the degradation products.

The supported catalyst intermediate 10 may reside in the shell-removal conditions for a predetermined amount of time, which may be easily experimentally determined using thermal gravimetric analysis to gauge when the shell material is completely removed. As an example, the time may be several hours or less.

The inert gas atmosphere is substantially free from oxygen and is thereby essentially unreactive with the carbon support 12. As an example, the atmosphere is controlled such that any oxygen present in the atmosphere is present at a level below which any significant oxidation of the carbon support is evident. Avoiding decomposition of the carbon support 12 maintains the surface area of the support and thereby avoids agglomeration of the platinum alloy cores 16 to provide a narrow particle size distribution (i.e., better monodispersity) and a high electrochemical surface area of platinum. In contrast, if sufficient oxygen were present, the oxygen would react with the carbon support 12 in addition to reacting with the organic shell 18, cause agglomeration (i.e., worse monodispersity) by reducing the surface area of the carbon support 12 and render the catalyst unsuitable for high activity applications such as fuel cells.

In the disclosed example compositions, the limited thermal decomposition of the carbon support 12 limits agglomeration of the catalyst material such that the supported catalyst nanoparticles 14' include an electrochemical surface area of at least 30 $m^2/g_{Pt}$. The electrochemical surface area refers to the exposed surface area of platinum that is available for electrochemical activity and may be determined experimentally using known standardized techniques. In further examples, the electrochemical surface area may be 40-60 $m^2/g_{Pt}$, 40-120 $m^2/g_{Pt}$, or 30-150 $m^2/g_{Pt}$, depending on the degree of thermal decomposition of the carbon support 12 and the annealing temperature.

In one comparative example, supported catalyst intermediate 10 samples were heated in simulated shell-removal atmospheres to remove the organic shells 18. Sample 1 was heated in a first atmosphere representing the inert shell-removal conditions disclosed herein and included approximately 100% nitrogen. Sample 2 was heated in a second atmosphere representing an oxidizing atmosphere and included 15% oxygen. Each sample was then analyzed to determine the amount of carbon remaining Sample 1 contained approximately 77 wt % carbon and Sample 2 contained approximately 35 wt % carbon, indicating that Sample 1 retained much more of the original carbon than Sample 2 because of the inert shell-removal conditions. Further, Sample 1 exhibited an electrochemical surface area of about 42 $m^2/g_{Pt}$ and Sample 2 exhibited an electrochemical surface area of about 22 m²/g$_{Pt}$, which is expected to result in better electrochemical performance for Sample 1.

The relatively high electrochemical surface area of the nanoparticles 14' yields enhanced electrochemical activity compared to unalloyed platinum. As an example, the nanoparticles 14' may exhibit an oxygen reduction reaction ("ORR") mass activity of greater than 2.5 relative to an unalloyed platinum catalyst. In some examples, the ORR may be 2.5-6.

The inert gas used in the method 30 may be selected from any type of inert gas that is unreactive with the carbon support 12 or other type of support used. As an example, the inert gas may be nitrogen, argon, or a mixture thereof and is substantially free of oxygen. A small amount of oxygen may be present as an impurity. For instance, oxygen may be present up to a few volume percent; however, in other examples, the oxygen may be present in a concentration less than one part per million.

In some examples, the inert gas may be a mixture of nitrogen and/or argon with hydrogen or other trace amount of a reducing gas. For instance, the mixture may include up to about 10 vol % hydrogen. The hydrogen is a reducing agent and reacts with any oxygen in the inert gas mixture to consume the oxygen before the oxygen can react with the carbon support 12. Additionally, the hydrogen may reduce any non-reduced alloy metals of the platinum alloy core 16 that remain from the polyol processing technique.

The elevated temperature used for removing the organic shell in step 34 may be 220° C. or higher. In a further example, the temperature may be about 250° C.-290° C. And in a further example, the temperature may be about 270° C. Using a temperature in the given range is effective to remove the organic shell 18 without significantly affecting the carbon support 12. Furthermore, temperatures in the given range are too low to influence the alloying of the platinum alloy core 16. Additionally, heating the nanoparticles 14 at higher temperatures may cause some agglomeration. However, the relatively low temperature used to remove the organic shell 18 limits agglomeration. The temperature of 270° C. may provide a desirable balance between avoiding agglomeration and rapidly removing the organic shells 18.

In some examples, the nanoparticles 14' may be annealed after removing the organic shell 18 to homogenize (i.e., uniformly disperse) the platinum and alloy metal(s) used in the platinum alloy core 16. Relatively low annealing temperatures may not be effective to homogenize the alloy and relatively high annealing temperatures may cause severe agglomeration. In one example, the supported catalyst 10' is annealed at 400° C.-1200° C. for a predetermined amount of time after removing the organic shell 18. In a further example, the annealing temperature may be 700° C.-1000° C., and in a further example, the annealing temperature may be 800° C.-1000° C. Homogenizing the alloying facilitates improvement of the stability of the supported catalyst 10' and improves the activity. The annealing may be preceded by a pre-annealing step, which may include pre-annealing at a temperature in the lower end of the given annealing temperature range, such as 400° C.

Figure 4:
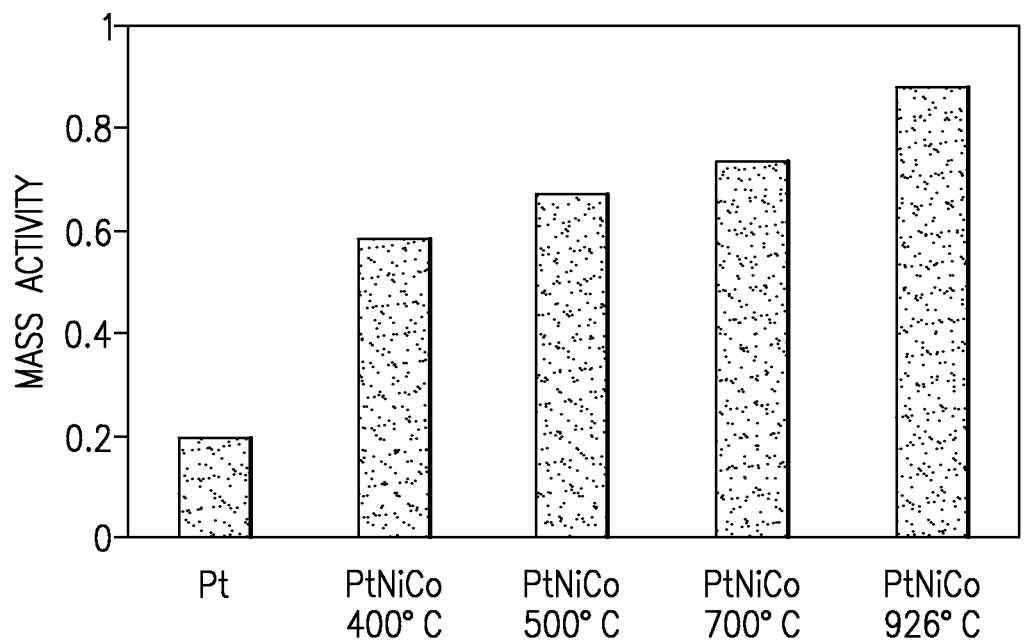
FIG. 4 illustrates a graph of mass activity of platinum alloys annealed at different temperatures compared with a state-of-the-art Pt catalyst.
Figure 5:
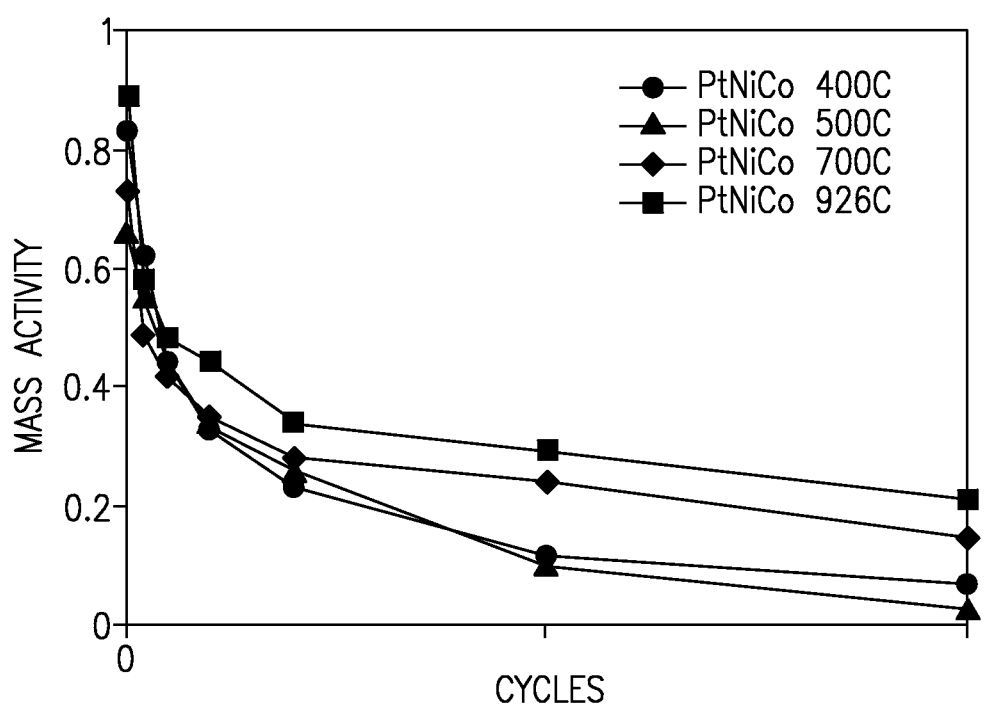
FIG. 5 illustrates a graph of mass activity versus potential cycling number for platinum alloy catalysts annealed at different temperatures.

FIGS. 4 and 5 illustrate examples of the influence of annealing temperature on the activity of the supported catalyst 10'. Table 1 below also includes data for several example compositions of the supported catalyst 10' and additionally shows electrochemical activity, platinum mass activity, platinum specific activity, and average particle size. In the graphs shown, the catalyst material of the supported catalyst 10' is platinum-nickel-cobalt. Pure platinum is also shown for comparison. In FIG. 4, the relative activity for annealing temperatures of 400° C., 500° C., 700° C. and 926° C. is shown. Higher annealing temperatures provide greater activity.

TABLE 1

| Catalysts | Annealing temperature (° C.) | Electrochemical area (m₂/g, Pt) | Pt mass activity (A/mg, Pt) | Pt specific activity (mA/cm₂, Pt) | Particle size (nm) |
| --- | --- | --- | --- | --- | --- |
| Pt (standard) | N/A | 80 | 0.2 | 0.25 | 2.5 ± 0.5 |
| Pt36Ni15Co49 | 400 | 57 | 0.58 | 1.01 | 4.0 ± 0.4 |
| Pt36Ni15Co49 | 500 | 48 | 0.66 | 1.38 | 4.3 ± 0.3 |
| Pt36Ni15Co49 | 700 | 48 | 0.73 | 1.52 | 4.4 ± 0.5 |
| Pt36Ni15Co49 | 926 | 47 | 0.87 | 1.84 | 5.8 ± 0.7 |
| Pt27Ir26Co47 | 400 | 116 | 0.72 | 0.63 | 3.3 ± 0.3 |
| Pt58V9Co33 | 400 | 79 | 0.58 | 0.73 | 2.3 ± 0.4 |

FIG. 5 illustrates the relative activity for platinum-nickel-cobalt catalysts processed at annealing temperatures of 400° C., 500° C., 700° C. and 926° C. versus potential cycles. In this case, higher annealing temperatures provide greater durability.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method, comprising:
forming a supported catalyst having an electrochemical surface area of at least 30 m²/g$_{Pt}$, the forming including:
establishing shell-removal conditions for a supported catalyst intermediate, the supported catalyst intermediate including nanoparticles of a catalyst material dispersed on a carbon support, the nanoparticles each including a platinum alloy core having an organic shell that fully surrounds the platinum alloy core, the establishing including providing an elevated temperature and an inert gas atmosphere, the inert gas atmosphere being substantially free of oxygen, wherein a concentration of oxygen in the inert gas atmosphere is less than one part per million; and
removing the organic shell that fully surrounds the platinum alloy core in the shell-removal conditions.

2. The method of claim 1, wherein the electrochemical surface area is 30-150 m²/g$_{Pt}$.

3. The method of claim 1, wherein the electrochemical surface area is 40-120 m²/g$_{Pt}$.

4. The method of claim 1, wherein the electrochemical surface area is 40-60 m²/g$_{Pt}$.

5. The method of claim 1, wherein the catalyst material comprises platinum, cobalt, and nickel in a composition Pt$_x$Co$_y$Ni$_z$, where the variables x, y, and z are atomic percentages that sum to 100, and x is 20%-60%, y is 20%-60%, and z=100−x−y, and the catalyst material has an oxygen reduction reaction mass activity of greater than 2.5 relative to an unalloyed platinum catalyst.

6. The method of claim 1, wherein the catalyst material comprises platinum, cobalt, and nickel in a composition $Pt_xCo_yNi_z$, where the variables x, y, and z are atomic percentages that sum to 100, and x is 20%-60%, y is 20%-60%, and z=100−x−y, and the catalyst material has an oxygen reduction reaction mass activity of 2.5-6 relative to an unalloyed platinum catalyst.

7. The method of claim 1, wherein the elevated temperature of the shell-removal conditions is 220° C.-600° C.

8. The method of claim 1, wherein the inert gas atmosphere is selected from a group consisting of nitrogen, argon, and combinations thereof.

9. The method of claim 1, wherein the catalyst material comprises platinum and at least one alloy metal selected from a group consisting of iron, nickel, cobalt, iridium, chromium, molybdenum, palladium, rhodium, gold, copper and vanadium.

10. The method of claim 1, wherein the catalyst material comprises platinum, cobalt, and at least one alloy metal M selected from a group consisting of iron, nickel, iridium, chromium, molybdenum, palladium, rhodium, gold, copper and vanadium and having a composition $Pt_xCo_yM_z$, where the variables x, y, and z are atomic percentages that sum to 100, and x is 20%-60%, y is 20%-60%, and z=100−x−y.

11. The method of claim 1, wherein the catalyst material comprises platinum, cobalt, and nickel in a composition $Pt_xCo_yNi_z$, where the variables x, y, and z are atomic percentages that sum to 100, and x is 20%-60%, y is 20%-60%, and z=100−x−y.

12. The method of claim 1, wherein the nanoparticles have an average particle size of 1-10 nanometers.

13. The method of claim 1, wherein the nanoparticles have an average particle size of 3-6 nanometers.

14. A method, comprising:
forming a supported catalyst having an electrochemical surface area of at least 30 $m^2/g_{Pt}$,
establishing shell-removal conditions for a supported catalyst intermediate, the supported catalyst intermediate including nanoparticles of a catalyst material dispersed on a carbon support, the nanoparticles each including a platinum alloy core having an organic shell that fully surrounds the platinum alloy core, the establishing including providing an elevated temperature and a reducing gas atmosphere, wherein a concentration of oxygen in the reducing gas atmosphere is less than one part per million, the reducing gas atmosphere including a reducing agent to react with oxygen in the reducing gas atmosphere such that the oxygen is consumed before reacting with the carbon support; and
completely removing the organic shell from the platinum alloy core in the shell-removal conditions.

15. The method of claim 14, further comprising:
annealing the supported catalyst intermediate after removing the organic shell.

16. The method of claim 14 wherein the reducing agent includes hydrogen.

17. A method, comprising:
forming a supported catalyst, the forming including:
treating a supported catalyst intermediate in a heat chamber, the supported catalyst intermediate including nanoparticles of a catalyst material dispersed on a carbon support, the nanoparticles each including a platinum alloy core having an organic shell that fully surrounds the platinum alloy core, the treating including:
elevating a temperature of the heat chamber;
providing an inert gas atmosphere in the heat chamber, the inert gas atmosphere being substantially free of oxygen, wherein a concentration of oxygen in the inert gas atmosphere is less than one part per million; and
removing the organic shell that fully surrounds the platinum alloy core, wherein the removing exposes an electrochemical surface area of the platinum alloy core, the electrochemical surface area of the platinum alloy core being at least 30 $m^2/g_{Pt}$.

18. The method of claim 17 wherein the treating includes regulating a concentration of the inert gas atmosphere in the heat chamber during removing of the organic shell from the platinum alloy core.

19. The method of claim 17 wherein the electrochemical surface area is 40-120 $m^2/g_{Pt}$.

* * * * *